United States Patent
Tokunaga

(10) Patent No.: US 7,299,480 B2
(45) Date of Patent: Nov. 20, 2007

(54) LOADING DISC OPTICAL DETECTION APPARATUS

(75) Inventor: Tomoshi Tokunaga, Zama (JP)

(73) Assignee: Victor Company of Japan, Limited, Yokohama (JP)

( * ) Notice: Subject to any disclaimer, the term of this patent is extended or adjusted under 35 U.S.C. 154(b) by 518 days.

(21) Appl. No.: 10/941,990

(22) Filed: Sep. 16, 2004

(65) Prior Publication Data

US 2005/0066341 A1   Mar. 24, 2005

(30) Foreign Application Priority Data

Sep. 22, 2003   (JP)   ............................ P2003-330421

(51) Int. Cl.
*G11B 17/03*   (2006.01)
*G11B 17/04*   (2006.01)
*G11B 33/02*   (2006.01)

(52) U.S. Cl. .................................................. 720/606

(58) Field of Classification Search ................. 720/606
See application file for complete search history.

(56) References Cited

U.S. PATENT DOCUMENTS

| | | | | |
|---|---|---|---|---|
| 4,695,995 A | * | 9/1987 | Koizumi ...................... 720/606 |
| 4,995,029 A | * | 2/1991 | Kobayashi et al. .......... 720/729 |
| 5,109,372 A | * | 4/1992 | Caspers et al. .............. 720/603 |
| 5,177,728 A | * | 1/1993 | Otsubo et al. ........... 369/47.24 |
| 5,226,032 A | * | 7/1993 | Ikedo et al. .............. 369/30.92 |
| 5,229,185 A | * | 7/1993 | Shiota et al. ................ 428/138 |
| 5,504,729 A | * | 4/1996 | Ikedo et al. ................ 720/614 |
| 5,724,332 A | * | 3/1998 | Ogusu ......................... 720/628 |
| 5,878,013 A | * | 3/1999 | Maeda et al. ............... 720/606 |
| 5,914,929 A | * | 6/1999 | Kato et al. .................. 720/656 |
| 5,933,400 A | * | 8/1999 | Kabasawa .................... 720/656 |
| 6,538,971 B2 | | 3/2003 | Seo et al. |
| 6,973,660 B2 | * | 12/2005 | Obata ......................... 720/616 |
| 2002/0131335 A1 | * | 9/2002 | Fujita ...................... 369/30.36 |

FOREIGN PATENT DOCUMENTS

| | | |
|---|---|---|
| JP | 2001-209997 | 8/2001 |
| JP | 2003-217214 | 7/2003 |

\* cited by examiner

*Primary Examiner*—Angel Castro
*Assistant Examiner*—Christopher R. Magee
(74) *Attorney, Agent, or Firm*—The Nath Law Group; Jerald L. Meyer; Jonathan A. Kidney

(57) ABSTRACT

A disc drive apparatus includes a tray member, on which a bare disc, or a cartridge accommodating a disc therein is placed, and a disc drive device, into or from which the tray member is loaded or ejected by a drive unit. A medium detection system includes detection holes provided on the tray member to detect a disc or a cartridge. In addition, provided on the disc drive device is a detection unit to optically detect a state including a type of a disc or a cartridge placed on the tray member based on whether the detection holes are shaded in the course of loading of the tray member.

4 Claims, 14 Drawing Sheets

|     |           | 31a 30a | 31b 30b | 31c 30c | 31d 30d | 31e 30e |
|-----|-----------|---------|---------|---------|---------|---------|
| (1) | CARTRIDGE | L L | L L | L L | L L | L L |
| (2) | 12cm DISK | H H | L L | L L | L L | L L |
| (3) | 8cm DISK  | H H | H H | L L | L L | H H |
| (4) | EMPTY     | H H | H H | H H | H H | H H |

LOADING DISC OPTICAL DETECTION APPARATUS

BACKGROUND OF THE INVENTION

The present invention relates to a disc drive apparatus that detects a type of a medium to be used.

Generally, in order to handle a disc appropriately, it is required that a disc drive apparatus detect a type of a medium to be used, as to type and size of the medium and as to whether the medium is a bare disc or accommodated in a cartridge.

With reference to a conventional disc drive apparatus (optical disc recording and reproducing device) shown in FIGS. 1 to 3, an explanation will be given on how to place a cartridge on a tray, a cartridge holding mechanism, and operations of loading and ejecting of a tray.

In FIG. 1, the reference numeral 201 denotes a body of an optical disc recording and reproducing device, 204 a tray, on which a cartridge and a bare optical disc are placed, and 100 a cartridge, in which an optical disc is accommodated.

A cartridge-placing surface 233 of the tray 204 is provided in the center thereof with two large and small recesses that are provided concentrically. A large-diameter recess defines a large-diameter disc-placing portion 231 and a small-diameter recess defines a small-diameter disc-placing portion 232, both recesses being prepared for use in accordance with an outside diameter of a disc placed in the optical disc recording and reproducing device 201.

In addition, the tray 204 is formed with a front wall 234, a left wall 235, and a right wall 236, which are slightly larger than outside dimension of the cartridge 100 and formed perpendicular to the cartridge-placing surface 233.

As shown in FIG. 2, a cartridge preloading member 237 is provided on an interior part of the tray 204 to be movable in a front/rear direction, and constructed to be held in a preloaded state on a front part of the tray 204.

Provided on a back surface of the tray 204 as shown in FIG. 3 is a rack gear 288 that engages with a final-stage drive gear of a loading gear system 281.

A loading motor 280 provided at the front part of a mechanical chassis 201a is switched in its rotation direction to enable the tray 204 to be loaded and ejected.

A traverse base 266 holds thereon a spindle motor 282 that holds and rotates a disc, an optical pickup 283 that reads and writes information from and onto a disc, a traverse motor 284 that moves the optical pickup 283 radially of a disc, and a lead screw 297.

A rear end of the traverse base 266 is turnably held on the mechanical chassis 201a by a torsion spring and a front end thereof is preloaded downward with a light load.

Two slit holes are provided right and left at the front end of the traverse base 266 to engage with a cam lever 285 that is inserted thereinto to turn about a rotating shaft 292 provided on a bottom surface of the mechanical chassis 201a. The traverse base 266 is vertically driven upon turning of the cam lever 285.

Provided on the traverse base 266 are two alignment pins 214 that engage with positioning holes of the cartridge 100 to keep a clearance between a disc held on the spindle motor 282 and the cartridge 100 to position the cartridge 100 where it does no contact with the disc.

A disc-state detection switch 215 is provided near the alignment pins 214. A plurality of detection switches mounted on a printed board are provided integrally with the traverse base 266 to distinguish a state of engagement with detection holes of the cartridge 100, thereby detecting a state of approval or denial of writing on a disc accommodated in the cartridge 100, front and back surfaces of a disc, and the recording capacity of a disc.

An upper base 228 as an upper lid is provided on the mechanical chassis 201a. Provided on the upper base 228 are a clamper 210 that fixes a disc to the spindle motor 282, clamp arms 212 that hold and make the clamper 210 vertically detachable from the spindle motor 282, and cartridge holding springs 229 that restrict vibrations of the cartridge 100 at the time of loading.

The cartridge 100 is fixed to the tray 204 by the downward biasing force of the cartridge holding springs 229. The biasing force of the cartridge holding springs 229 functions to urge the cartridge 100 against the tray 204 and urge the tray 204 against the mechanical chassis 201a from immediately after the beginning of loading to the completion of loading to eliminate looseness generated among the cartridge 100, the tray 204, and the mechanical chassis 201a, thus reducing vibrations and noise that are generated at the time of loading and rotation of a disc.

An operation of the optical disc recording and reproducing device 201 configured in the above manner will be described taking the case of reproducing a disc accommodated in the cartridge 100.

When placing the cartridge 100 on the tray 204 surrounded by the front wall 234, the left wall 235, and the right wall 236, placement of the cartridge 100 on the tray 204 is completed by sliding the cartridge 100 obliquely downward from forwardly upward of the tray 204 while causing a rear end of the cartridge 100 to push the cartridge preloading member 237 into the further inner part of the tray 204, and finally placing a front end of the cartridge 100 on the cartridge-placing surface 233 in a manner to bring the front end of the cartridge 100 into contact with an inner side of the front wall 234.

At this time, the front end of the cartridge 100 is pushed against the inner side of the front wall 234 by the cartridge preloading member 237 and the cartridge 100 is positioned relative to the tray 204 without looseness in back and forth and right to left directions.

The tray 204, on which the cartridge 100 is placed, is automatically loaded inside the optical disc recording and reproducing device 201 by a drive force of the loading motor 280.

Until loading of the tray 204 is completed, the spindle motor 282, the traverse motor 284, and the optical pickup 283, which are held on the traverse base 266, escape below a loading path of the tray 204 in order to avoid interference with the tray 204, the cartridge 100, and the disc.

Immediately before loading of the tray 204 is completed, a clamp-arm driving projection provided on the tray 204 pushes up one side of the clamp arm 212 that are turnably provided on the upper base 228 by hinges, and lowers the other side of the clamp arm 212, on which the clamper 210 is held. As a result, the clamper 210 is lowered to a position where a disc can be clamped.

When loading of the cartridge 100 placed on the tray 204 is completed after the clamper 210 is lowered, engagement between the tray 204 and the rack gear 288 is released, a drive force by the drive gear is cut off from the tray 204, and only the rack gear 288 is driven rearward relative to the tray 204. The force that drives the rack gear 288 rearward is transmitted to the cam lever 285 as torque of rotation, so that the traverse base 266 ascends along an inclination of the cam lever 285.

As the traverse base 266 ascends, the two alignment pins 214 provided integrally on the traverse base 266 are inserted into two positioning holes provided on the front part of the cartridge 100.

The cartridge 100 is caused to be positionally offset relative to the spindle motor 282 at the time of loading due to looseness between the tray 204 and the mechanical chassis 201a and looseness between the cartridge 100 and the tray 204. When a disc rotates while the cartridge 100 is offset relative to the spindle motor 282, noise is generated due to contact between an outer periphery of the disc and the inner wall of the cartridge 100. When there is a large positional offset, contact acts as resistance to release the clamped state of a disc which may damage the disc inside the cartridge 100.

The alignment pins 214 are inserted into the positioning holes of the cartridge 100 whereby the positional offset of the cartridge 100 relative to the spindle motor 282 is improved and an adequate clearance is ensured between the cartridge 100 and a disc.

Almost simultaneously with insertion of the alignment pins 214 into the positioning holes of the cartridge 100, the disc-state detection switch 215 is also inserted into the state detection hole of the cartridge 100.

Unlike the alignment pins 214, a large clearance is ensured between the state detection hole and the disc-state detection switch 215, so that the insertion is guaranteed with a margin with respect to detection of a state of the cartridge 100 even when the cartridge 100 is positionally offset.

With the insertion of the alignment pins 214 and the disc-state detection switch 215 into the cartridge 100, a center cone is inserted into a center hole of a disc accommodated in the cartridge 100 and the disc floats in a space inside the cartridge 100 while the traverse base 266 ascends.

As the disc floats, the clamper 210 standing by in a clamp position engages with the center cone and clamping of the disc is completed.

However, the conventional disc drive apparatus (optical disc recording and reproducing device) described above involves the following problem.

With respect to distinguishing the media, the switches arranged on the traverse distinguishes a cartridge immediately before the completion of loading. In addition, a 12-cm disc and an 8-cm disc are distinguished from each other after the spindle motor is rotated. Therefore, a preparatory time from insertion of a medium to the start is very long, casing such a problem that a desired scene can not be recorded.

Since there is not provided any means to detect a state of erroneous placement at the time of loading, there is the possibility that a disc falls off inside the drive at the time of loading and the disc cannot be taken out, if an 8-cm disc of small diameter is erroneously placed, offset from a predetermined position on a tray, which has a large opening at the center thereof.

Further, if a disc surface is clamped while the disc is erroneously placed, the disc surface may be damaged.

SUMMARY OF THE INVENTION

The present invention has been achieved with a view to such problems, and the object of the invention is to provide a disc drive apparatus that can detect a state including a type of a medium placed on a tray in the course of loading of the tray.

The present invention is directed to solve the problems of the prior art, and a first aspect of the invention provides a disc drive apparatus comprising a disc drive device, into or from which a tray member with a medium placed thereon is loaded or ejected by a drive unit, and a detection unit that detects a shape and a type of a medium placed on the tray member in the course of loading of the tray member.

A second aspect of the invention provides a disc drive apparatus comprising a tray member, on which a bare disc, or a cartridge accommodating a disc therein is placed, a disc drive device, into or from which the tray member is loaded or ejected by a drive unit, detection holes provided on the tray member to detect a disc or a cartridge, and a detection unit provided on the disc drive device to optically detect a state including a type of a disc or a cartridge placed on the tray member based on whether the detection holes are shaded in the course of loading of the tray member.

A third aspect of the invention provides the disc drive apparatus according to the second aspect of the invention, wherein the tray member comprises a placing-surface, on which at least a disc having one size is placed, and a placing-surface, on which a cartridge is placed, on which surfaces central positions of discs are made vertically coincident together, and the detection holes are aligned at least one to each of the placing-surfaces on straight lines passing over that surface, on which a disc of a minimum size is placed, along a movement direction by the drive unit.

A fourth aspect of the invention provides the disc drive apparatus according to the third aspect of the invention, wherein the tray member comprises an opening of a predetermined width to be clear of an optical pickup, the opening passing through centers of the placing-surfaces along the movement direction by the drive unit, and the detection holes are aligned at least one to each of the placing-surfaces on two straight lines that extend on both sides of the opening along the movement direction.

A fifth aspect of the invention provides the disc drive apparatus according to the third aspect of the invention, wherein the detection holes on the respective placing-surfaces, on which discs are placed, are arranged slightly inside of outer diameters of recording surfaces of the discs placed in predetermined positions on the placing-surfaces.

A sixth aspect of the invention provides the disc drive apparatus according to the fourth aspects of the invention, wherein the detection holes on the respective placing-surfaces, on which discs are placed, are arranged slightly inside of outer diameters of recording surfaces of the discs placed in predetermined positions on the placing-surfaces.

A seventh aspect of the invention provides the disc drive apparatus according to the third aspect of the invention, wherein the detection unit comprises optical-path generating member provided in the front side of the disc drive device and in upper and lower positions corresponding to tracks of movement, along which the detection holes aligned on the straight lines pass upon movement by the drive unit, the optical-path generating member generating optical paths to intersect the tracks of movement, and a state including a type of a disc or a cartridge placed on the tray member is detected based on shaded patterns of the optical paths by the respective detection holes that pass positions corresponding to the optical-path generating member as the tray member is moved.

A eighth aspect of the invention provides the disc drive apparatus according to the fourth aspect of the invention, wherein the detection unit comprises optical-path generating members provided in the front side of the disc drive device and in upper and lower positions corresponding to tracks of movement, along which the respective detection holes aligned on the straight lines pass upon movement by the drive unit, the optical-path generating members generating optical paths to intersect the tracks of movement, and a state including a type of a disc or a cartridge placed on the tray member is detected based on shaded patterns of the optical paths by the respective detection holes that pass positions corresponding to the optical-path generating members as the tray member is moved.

A ninth aspect of the invention provides the disc drive apparatus according to the fifth aspect of the invention, wherein the detection unit comprises optical-path generating member provided in the front side of the disc drive device and in upper and lower positions corresponding to tracks of movement, along which the detection holes aligned on the straight lines pass upon movement by the drive unit, the optical-path generating member generating optical paths to intersect the tracks of movement, and a state including a type of a disc or a cartridge placed on the tray member is detected based on shaded patterns of the optical paths by the respective detection holes that pass positions corresponding to the optical-path generating member as the tray member is moved.

A tenth aspect of the invention provides the disc drive apparatus according to the sixth aspect of the invention, wherein the detection unit comprises optical-path generating members provided in the front side of the disc drive device and in upper and lower positions corresponding to tracks of movement, along which the respective detection holes aligned on the straight lines pass upon movement by the drive unit, the optical-path generating members generating optical paths to intersect the tracks of movement, and a state including a type of a disc or a cartridge placed on the tray member is detected based on shaded patterns of the optical paths by the respective detection holes that pass positions corresponding to the optical-path generating members as the tray member is moved.

A eleventh aspect of the invention provides the disc drive apparatus according to the seventh aspect of the invention, wherein the detection unit prepares data of shaded patterns of the optical paths beforehand to establish a reference for every disc or cartridge being handled when the disc or the cartridge is placed in a predetermined position, and detects what size of a disc or a cartridge a medium placed on the tray member corresponds to, and whether a placement position of the disc or the cartridge is a predetermined position on a predetermined placing-surface, by making a comparison between the data of shade patterns of the optical paths obtained by the movement of the tray member and the reference data of shade patterns of the optical paths.

A twelfth aspect of the invention provides the disc drive apparatus according to the eighth aspect of the invention, wherein the detection unit prepares data of shaded patterns of the optical paths beforehand to establish a reference for every disc or cartridge being handled when the disc or the cartridge is placed in a predetermined position, and detects what size of a disc or a cartridge a medium placed on the tray member corresponds to, and whether a placement position of the disc or the cartridge is a predetermined position on a predetermined placing-surface, by making a comparison between the data of shade patterns of the optical paths obtained by the movement of the tray member and the reference data of shade patterns of the optical paths.

A thirteenth aspect of the invention provides the disc drive apparatus according to the ninth aspect of the invention, wherein the detection unit prepares data of shaded patterns of the optical paths beforehand to establish a reference for every disc or cartridge being handled when the disc or the cartridge is placed in a predetermined position, and detects what size of a disc or a cartridge a medium placed on the tray member corresponds to, and whether a placement position of the disc or the cartridge is a predetermined position on a predetermined placing-surface, by making a comparison between the data of shade patterns of the optical paths obtained by the movement of the tray member and the reference data of shade patterns of the optical paths.

A fourteenth aspect of the invention provides the disc drive apparatus according to the tenth aspect of the invention, wherein the detection unit prepares data of shaded patterns of the optical paths beforehand to establish a reference for every disc or cartridge being handled when the disc or the cartridge is placed in a predetermined position, and detects what size of a disc or a cartridge a medium placed on the tray member corresponds to, and whether a placement position of the disc or the cartridge is a predetermined position on a predetermined placing-surface, by making a comparison between the data of shade patterns of the optical paths obtained by the movement of the tray member and the reference data of shade patterns of the optical paths.

BRIEF DESCRIPTION OF THE DRAWINGS

The above and further objects and novel features of the present invention will more fully appear from the following detailed description when the same is read in conjunction with the accompanying drawings, in which.

DETAILED DESCRIPTIONS

Preferred embodiments of the present invention will be explained below with reference to FIGS. 4 to 19.

Figure 1:
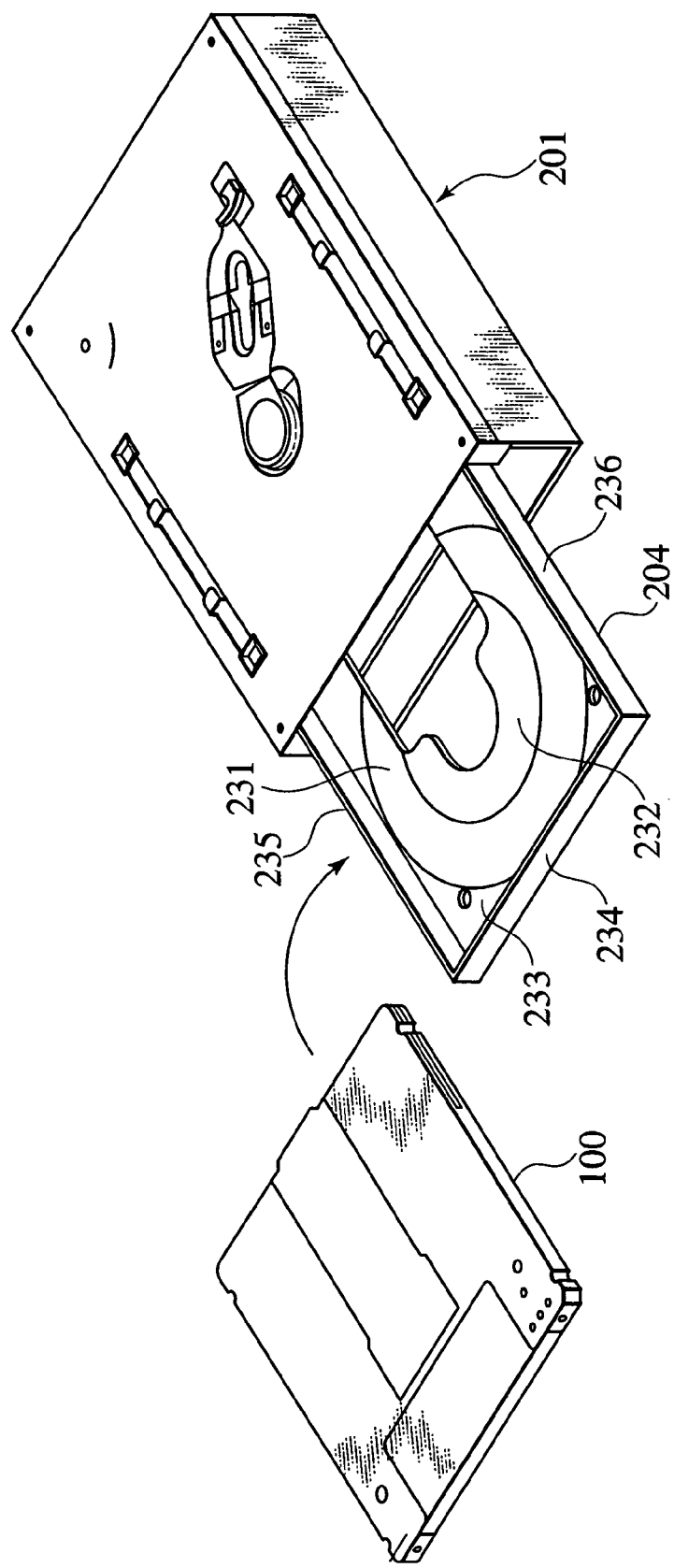
FIG. 1 is a perspective view showing a conventional example as a whole.
Figure 2:
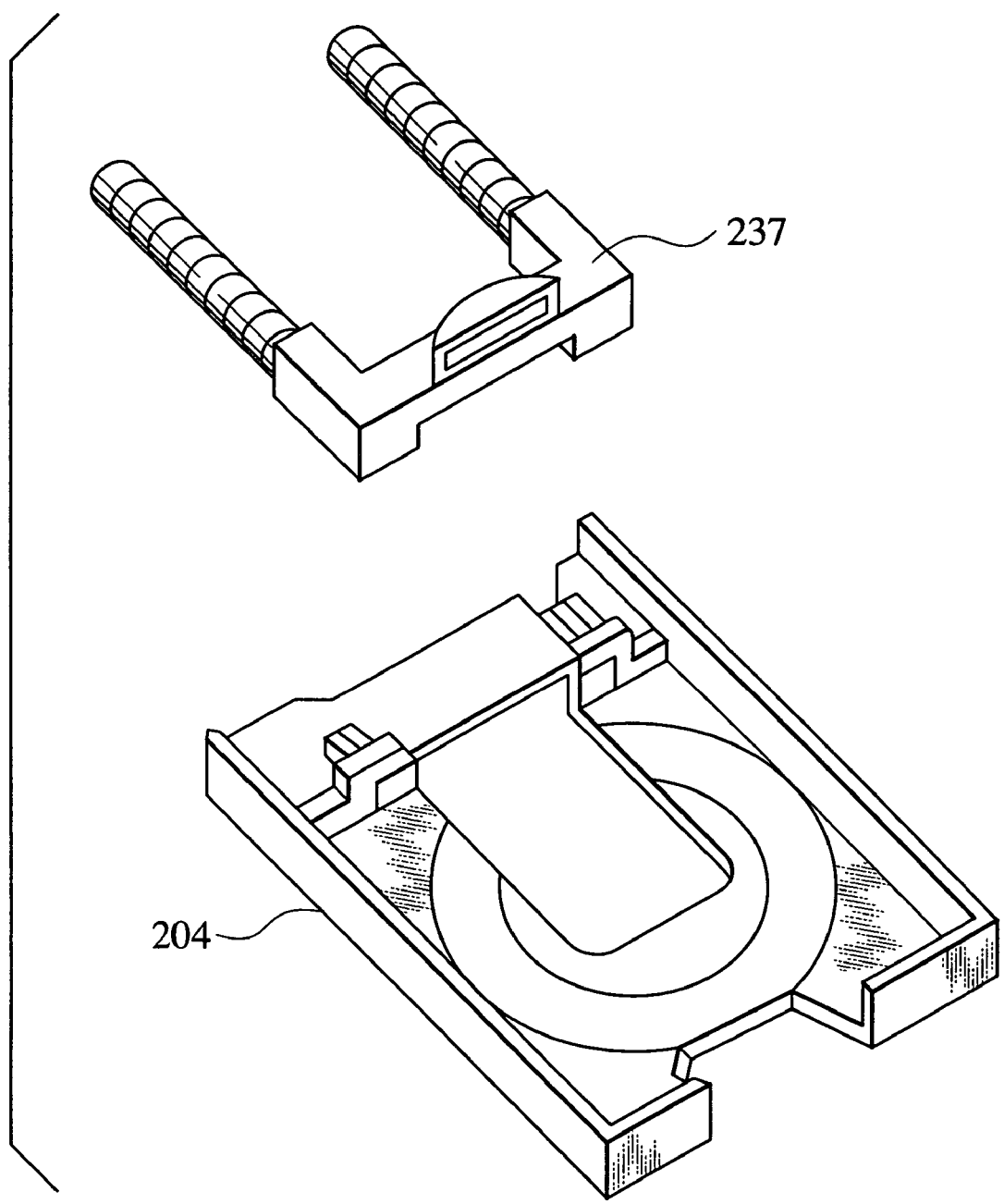
FIG. 2 is a perspective view showing a tray in the conventional example.
Figure 3:
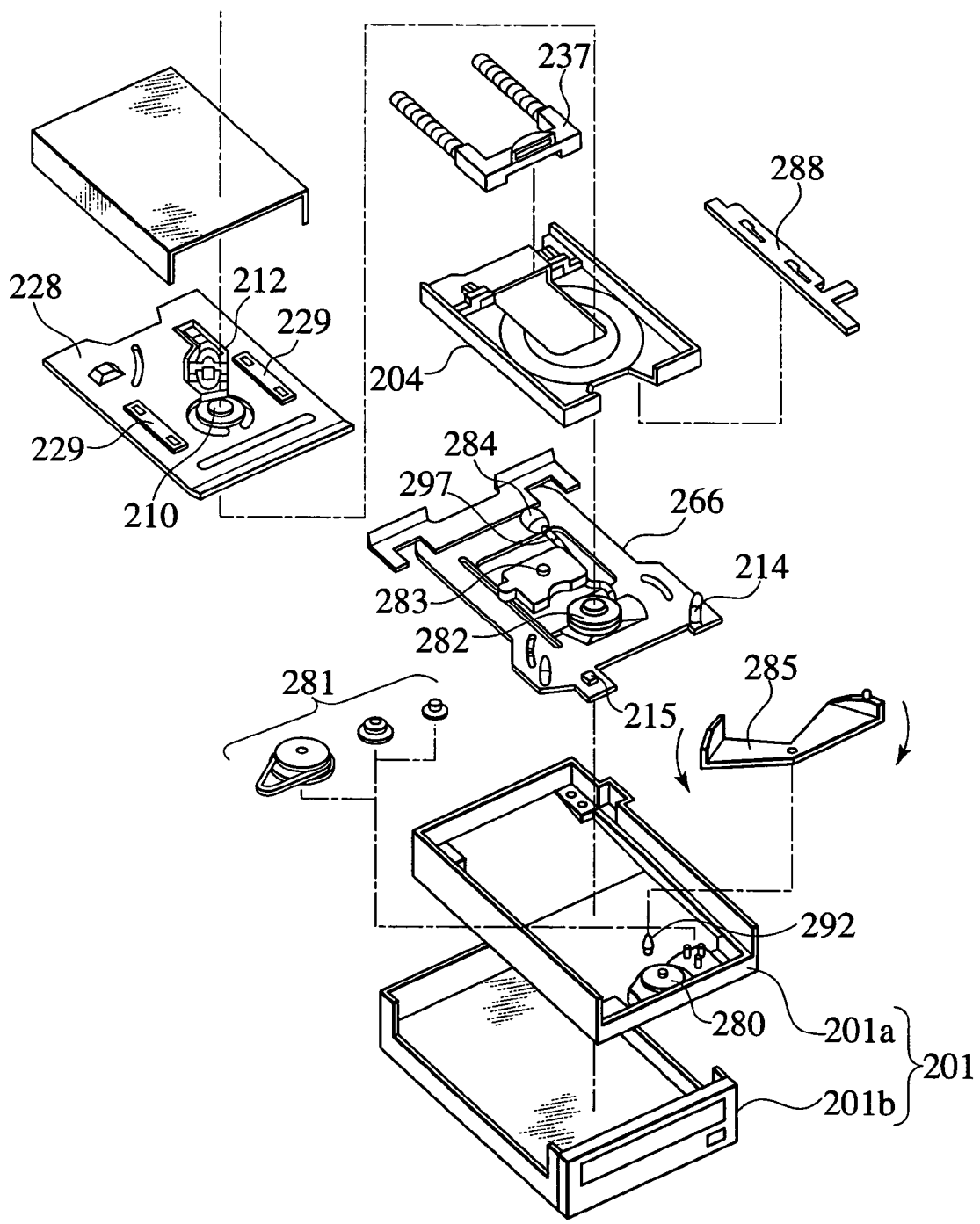
FIG. 3 is an exploded, perspective view showing the conventional example as a whole.
Figure 4:
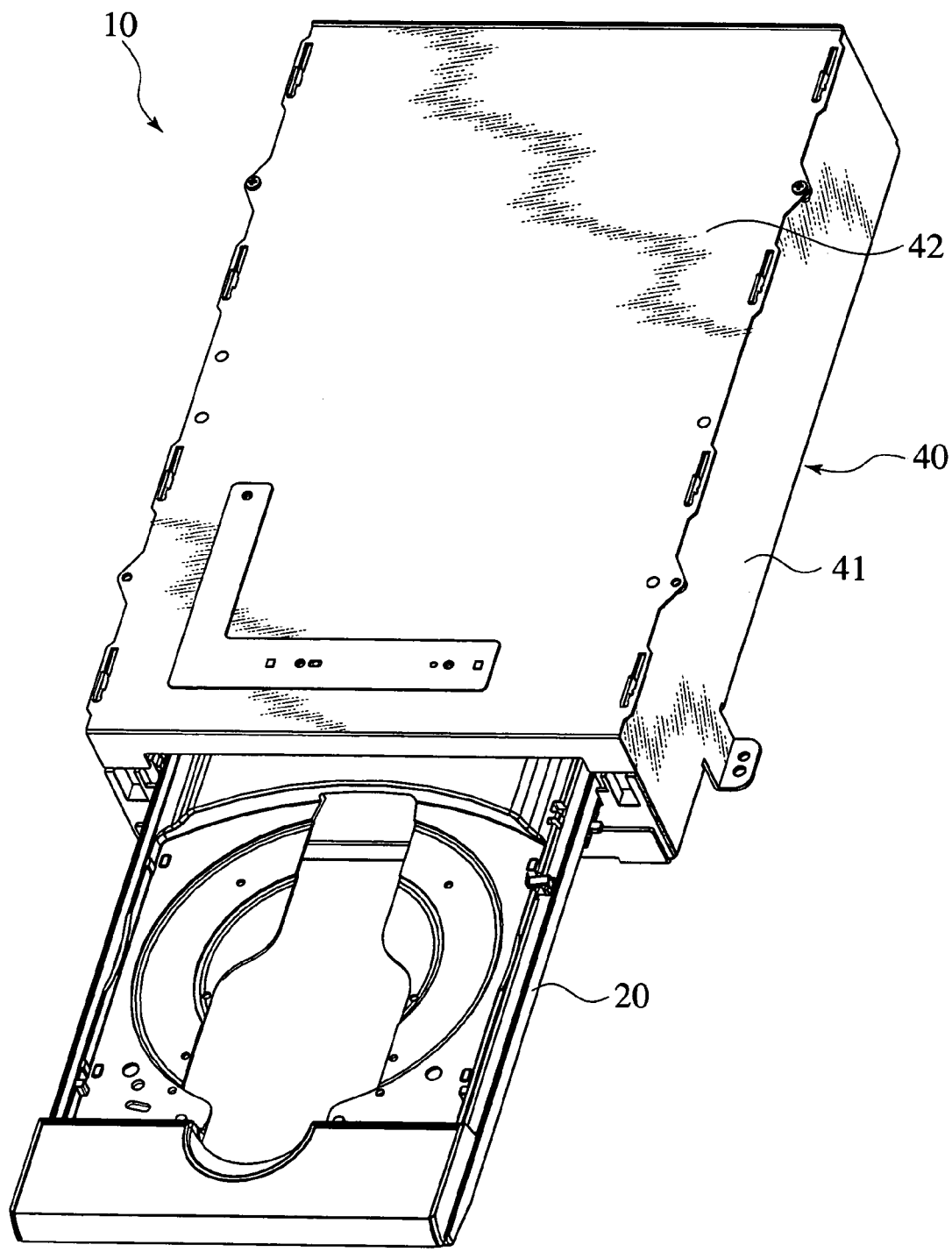
FIG. 4 is a perspective view showing an embodiment of a disc drive apparatus according to the invention.

FIG. 4 is a perspective view showing an embodiment of a disc drive apparatus according to the present invention, a disc drive apparatus 10 includes a tray 20, on which a medium is placed, and a disc drive device 40, into and from which the tray 20 is conveyed by a drive motor (not shown).

The disc drive apparatus 10 is not of a type that a traverse base provided with a spindle motor is moved up and down relative to a medium held in a predetermined height to have the spindle motor loaded on a disc, but of a type that a medium placed on the tray 20 is moved up and down near completion of loading to have a disc loaded on a spindle motor.

Figure 5:
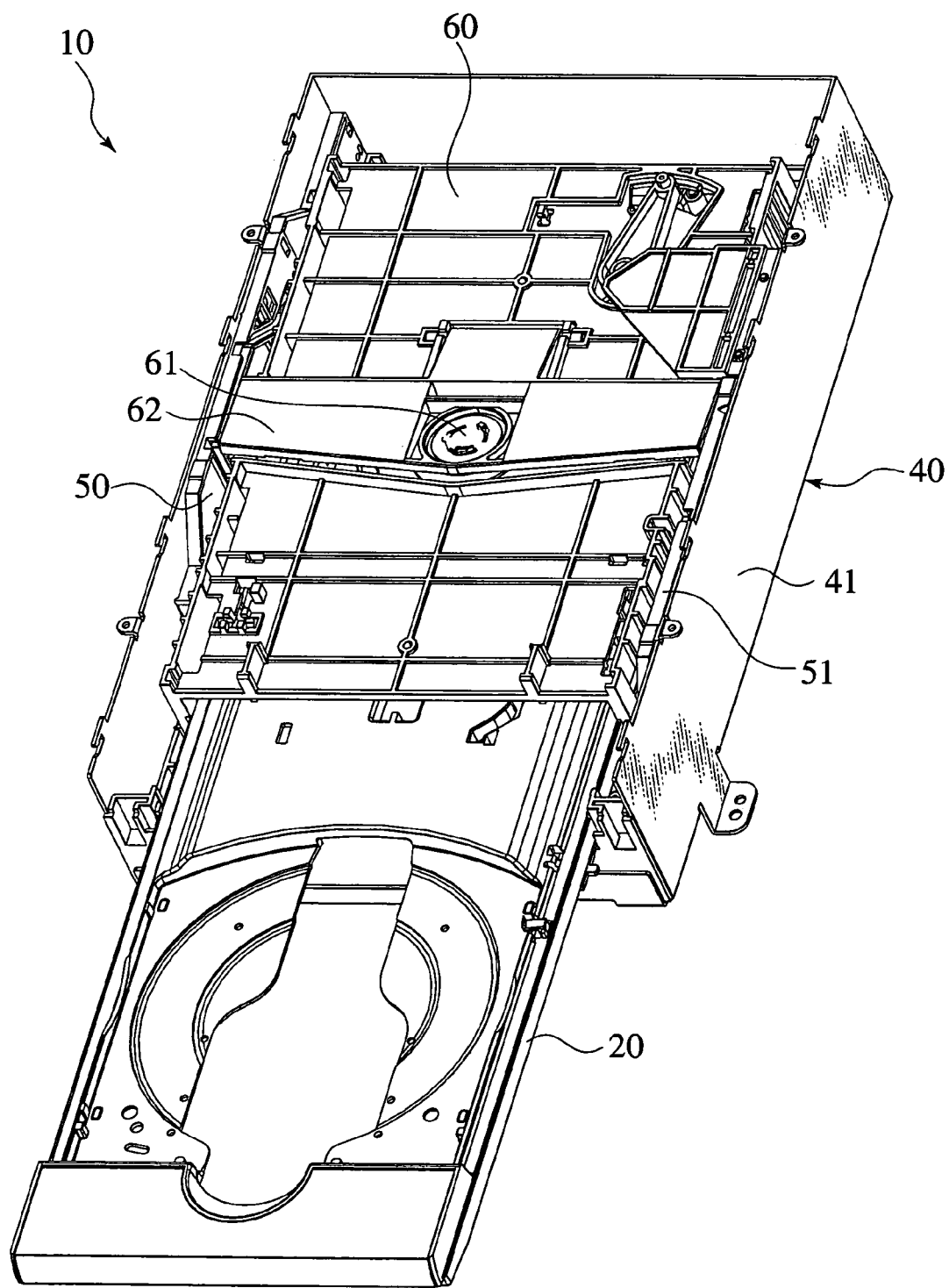
FIG. 5 is a perspective view showing a state, in which a top cover is removed.

The disc drive device 40 is configured such that a mechanical chassis 41 is covered by a top cover 42. FIG. 5 shows a state, in which the top cover 42 is removed, and a tray holder 60 is arranged in the disc drive device 40 to support the tray 20 allowing horizontal movement of the tray 20 in a front/rear direction.

A clamper 61 that fixes a disc to a spindle motor (not shown) is supported on the tray holder 60 by a clamp arm 62 to be made vertically detachable from the spindle motor.

Slide cams 50 and 51 are provided on both left and right side walls of the disc drive device 40 to be horizontally movable in the front/rear direction. In addition, the left and right slide cams 50 and 51 are mounted on both ends of a connection arm (not shown) that is provided in the center of a bottom of the mechanical chassis 41 to be able to swing around a pivot.

A rack gear (not shown) is provided below the right slide cam 51, and the rack gear meshes with a pinion gear that is driven by a loading motor (not shown) provided on a lower portion of the right front side of the disc drive device 40.

Therefore, when the pinion gear is driven to move the right slide cam 51 horizontally rearward, the left slide cam 50 connected thereto by the connection arm is moved horizontally forward. In addition, the loading motor is switched in a rotation direction to reverse moving directions of the left and right slide cams 50 and 51.

Figure 6:
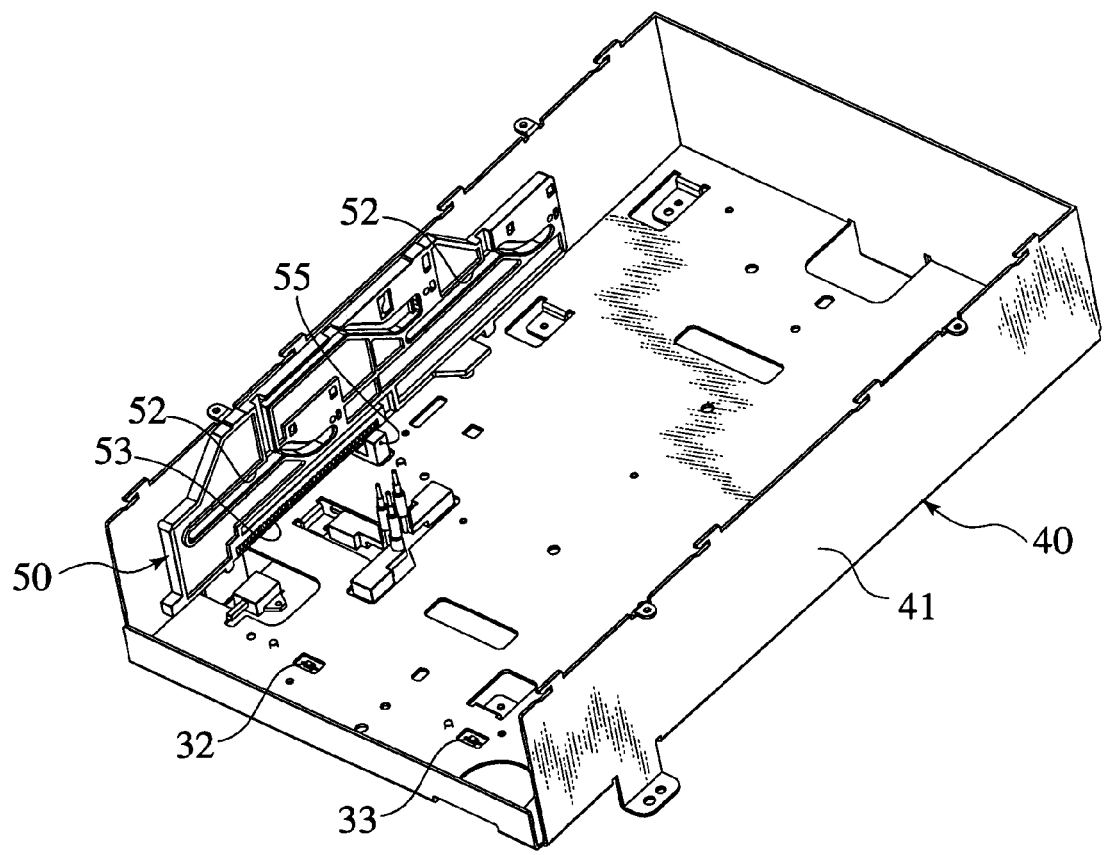
FIG. 6 is a perspective view showing the arrangement of a slide cam, an optical sensor, and light emitting diodes.

The tray holder 60 is supported to be vertically movable relative to the mechanical chassis 41. In addition, projections (not shown) provided on both left and right side walls of the tray holder 60 are in engagement with grooved actuation cams that are formed on the left and right slide cams 50 and 51. FIG. 6 shows the left slide cam 50 and the actuation cams 52 formed thereon.

As shown in FIG. 6, each of the actuation cams 52 on the left slide cam 50 is formed with a downwardly inclined portion that is contiguous to a horizontal portion extended rearward from the front side. On the other hand, the actuation cams on the right slide cam 51 is formed with a downwardly inclined portion that is contiguous to a horizontal portion extended the front side from a rear part.

Therefore, when the pinion gear is driven to move the right slide cam 51 horizontally rearward and to move the left slide cam 50 horizontally forward, the tray holder 60 is held in a high position on the way along the movement path just till beyond midway of the path. Then, the tray holder 60 descends near a terminal end of the movement path to be switched to a low position to be held there.

Furthermore, when the loading motor is switched in the rotation direction so that the right slide cam 51 moves horizontally forward and the left slide cam 50 moves horizontally rearward, the tray holder 60 ascends to a high position from a low position near a starting end of the movement path and thereafter it is held in a high position.

The high position of the tray holder 60 is a height at which loading and ejecting of a medium are performed, while the low position of the tray holder 60 is a height at which a medium is loaded on a spindle motor (not shown).

As shown in FIG. 6, the left slide cam 50 is provided with a ladder portion 53 that includes a plurality of slits formed with a uniform space along a moving direction of the slide cam 50. Optical sensors 55 are mounted on a printed board to interpose the ladder portion 53 from left and right, and fixed to the bottom of the mechanical chassis 41.

Therefore, when the slide cam 50 moves, the optical sensor 55 detects light passing through the slit of the ladder portion 53, whereby a pulsed output is obtained. A counter (not shown) counts the pulsed output, thereby enabling accurate recognition of a present position of the slide cam 50 in a region of movement in real time.

Figure 8:
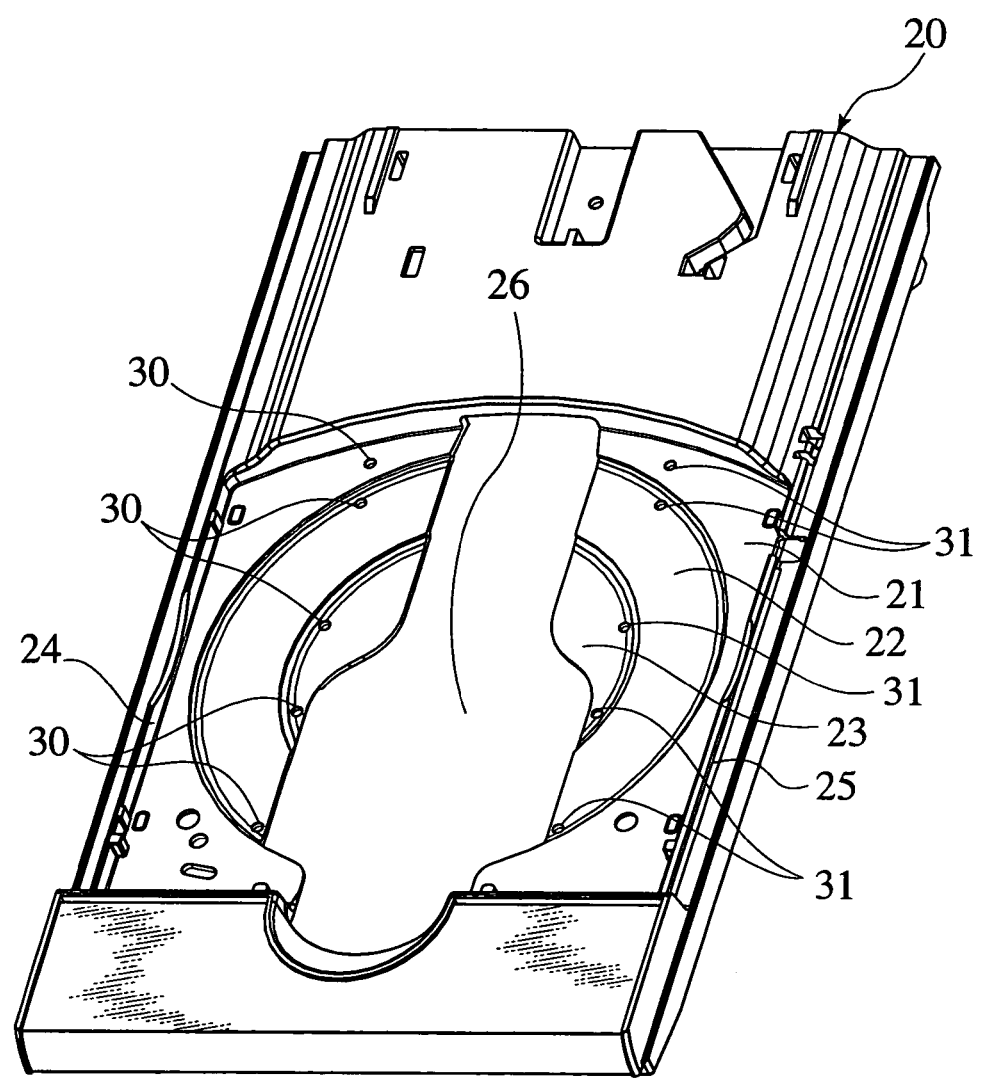
FIG. 8 is a perspective view showing a tray.
Figure 9:
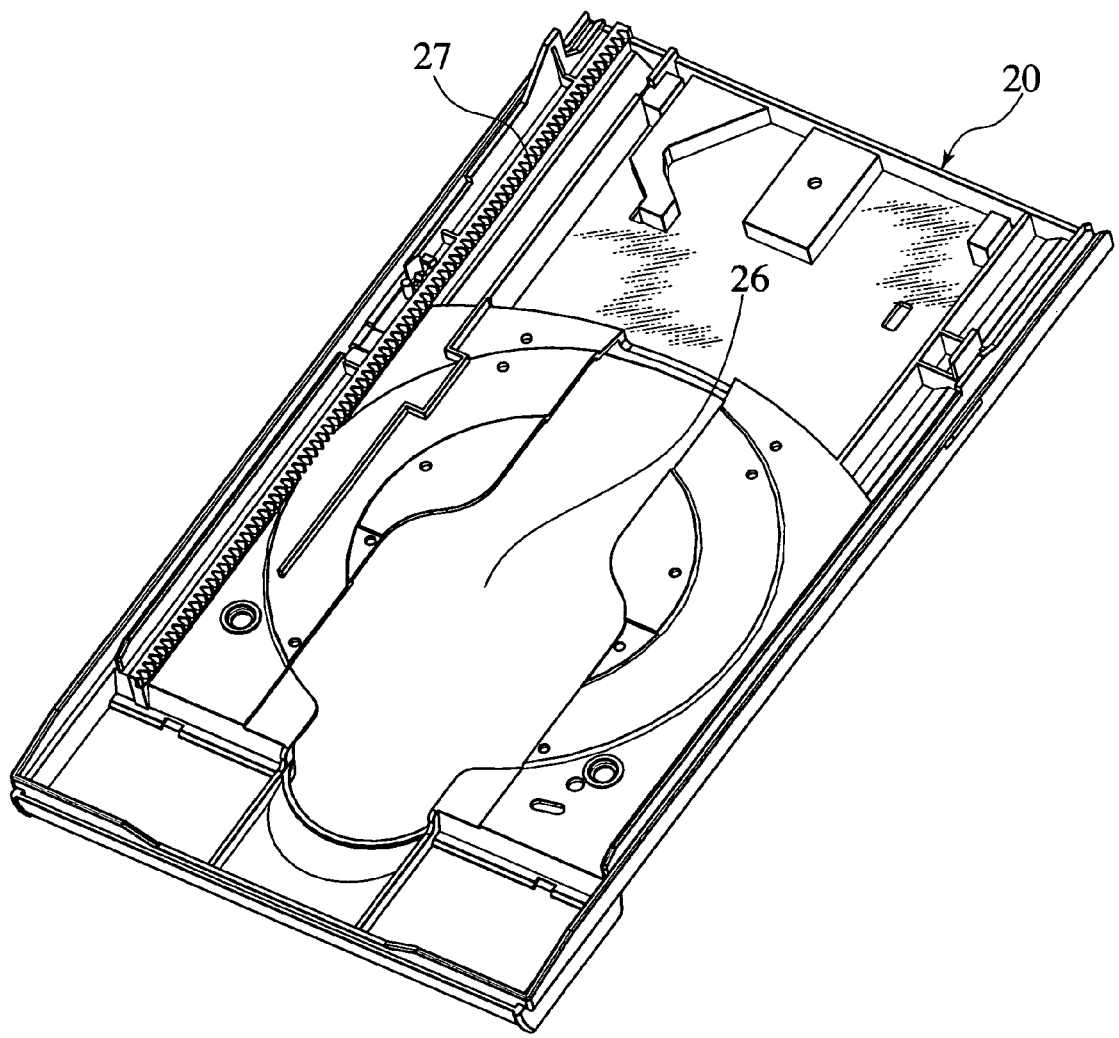
FIG. 9 is a perspective view showing the tray as viewed from a back surface thereof.

FIG. 8 is a perspective view showing the tray 20, and FIG. 9 is a perspective view showing the tray 20 as viewed from the back surface thereof. The tray 20 is configured to be able to place thereon a cartridge 1 (see FIG. 11) that accommodates therein a disc, and bare discs 2 (see FIG. 12) and 3 (see FIG. 13) of two large and small sizes, as a medium.

As shown in FIG. 8, the tray 20 includes a cartridge-placing surface 21 to place thereon the cartridge 1, a large-diameter disc-placing surface 22 to place thereon a large-diameter (for example, 12 cm) disc 2, and a small-diameter disc-placing surface 23 to place thereon a small-diameter (for example, 8 cm) disc 3, such that central positions of the discs are made coincident vertically with one another.

That is, the cartridge-placing surface 21 on the tray 20 is formed to be a recess having a size to accommodate therein the cartridge 1, in comparison with heights in front and in rear, and a left wall 24 and a right wall 25, which are formed on both left and right sides of the tray 20, function as left and right positioning guides when the cartridge 1 is to be placed on the tray 20.

The large-diameter disc-placing surface 22 and the small-diameter disc-placing surface 23 are arranged concentrically in a central position of a disc accommodated in the cartridge 1 on the cartridge-placing surface 21, the large-diameter disc-placing surface 22 being slightly recessed relative to the cartridge-placing surface 21, and the small-diameter disc-placing surface 23 being slightly recessed relative to the large-diameter disc-placing surface 22.

An opening 26 of a predetermined width to be clear of an optical pickup (not shown) provided in the disc drive device 40 is formed on the cartridge-placing surface 21, the large-diameter disc-placing surface 22, and the small-diameter disc-placing surface 23 on the tray 20 to extend through central portions thereof and along the front/rear direction, in which the tray 20 moves.

As shown in FIG. 9, a rack gear 27 is provided on a back surface of the tray 20 to mesh with a drive gear that is driven by a loading motor (not shown) provided in a lower portion of the right front side of the disc drive device 40. The tray 20 is configured to make it possible to select loading (carrying-in) and ejecting (carrying-out) upon switching the rotation direction of the loading motor.

In this manner, the pinion gear to drive the right slide cam 51, and the drive gear to drive the tray 20 are driven by the same loading motor. Therefore, the optical sensor 55 detects light passing through the slit of the ladder portion 53 provided on the left slide cam 50, and the counter counts pulse outputs thus obtained, thereby enabling accurate recognition of not only a position of the slide cam 50 but also the present position of the tray 20 in the region of movement in real time.

Figure 10:
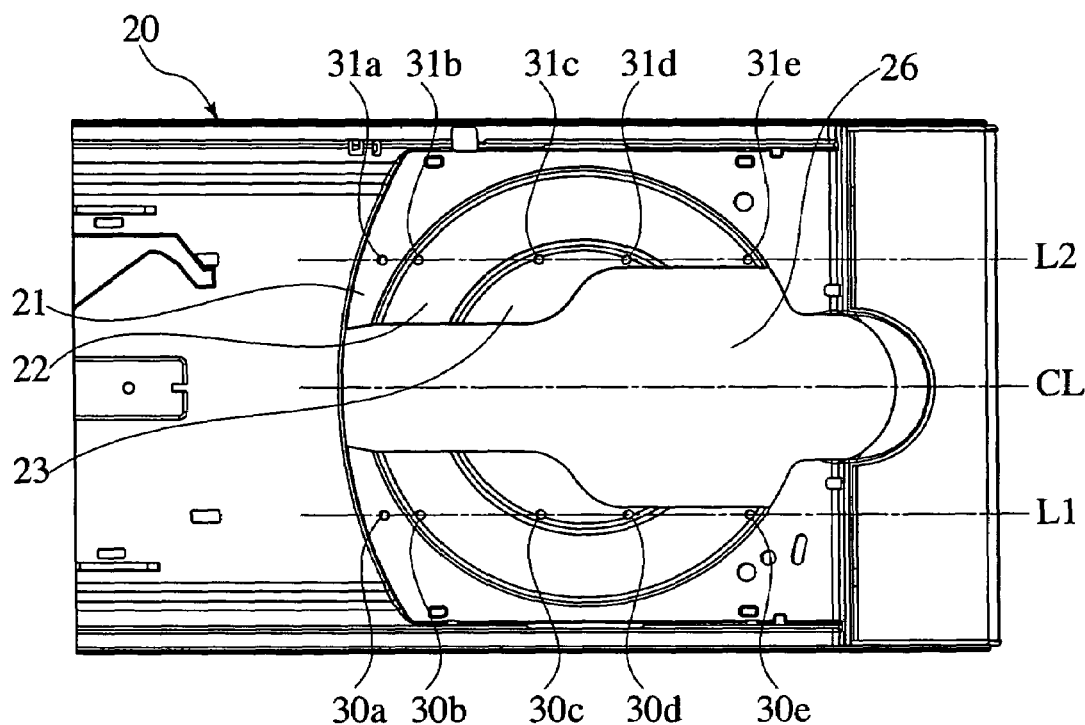
FIG. 10 is a plan view showing the arrangement of detection holes on the tray.

As shown in FIGS. 8 to 10, the tray 20 is formed with a plurality of detection holes 30 and 31 for detection of a medium. The detection holes 30 and 31 are arranged symmetrically in the left and right directions on two straight lines L1, L2 that are in parallel to the center line CL on both left and right sides of the opening 26 in the movement direction of the tray 20 to extend on the small-diameter disc-placing surface 23.

That is, the detection holes 30a and 31a are formed on the cartridge-placing surface 21 of the tray 20 to be symmetrical in the left and right directions rearward of the large-diameter disc-placing surface 22.

The detection holes 30b and 31b are formed on the large-diameter disc-placing surface 22 to be symmetrical in the left and right directions rearward of the small-diameter disc-placing surface 23, and the detection holes 30e and 31e are formed on the large-diameter disc-placing surface 22 to be symmetrical in the left and right directions forward of the small-diameter disc-placing surface 23.

All the detection holes 30b, 31b, 30e and 31e are arranged slightly inside of an outer diameter of a recording surface of the large-diameter disc (12-cm disc) 2 placed in a predetermined position on the large-diameter disc-placing surface 22.

The detection holes 30c and 31c are formed in the rear side on the small-diameter disc-placing surface 23 to be symmetrical in the left and right direction, and the detection holes 30d and 31d are formed in the front side on the small-diameter disc-placing surface 23 to be symmetrical in the left and right direction.

All the detection holes 30c, 31c, 30d and 31d are arranged slightly inside of an outer diameter of a recording surface of the small-diameter disc (8-cm disc) 3 placed in a predetermined position on the small-diameter disc-placing surface 23.

As shown in FIG. 6, two light emitting diodes 32 and 33 are provided in the front side of the disc drive device 40 forwardly of the tray holder 60 and symmetrical in the left and right directions and to be positioned just below the straight lines L1, L2, the light emitting diodes being mounted on the printed board to be fixed to the bottom of the mechanical chassis 41.

Figure 7:
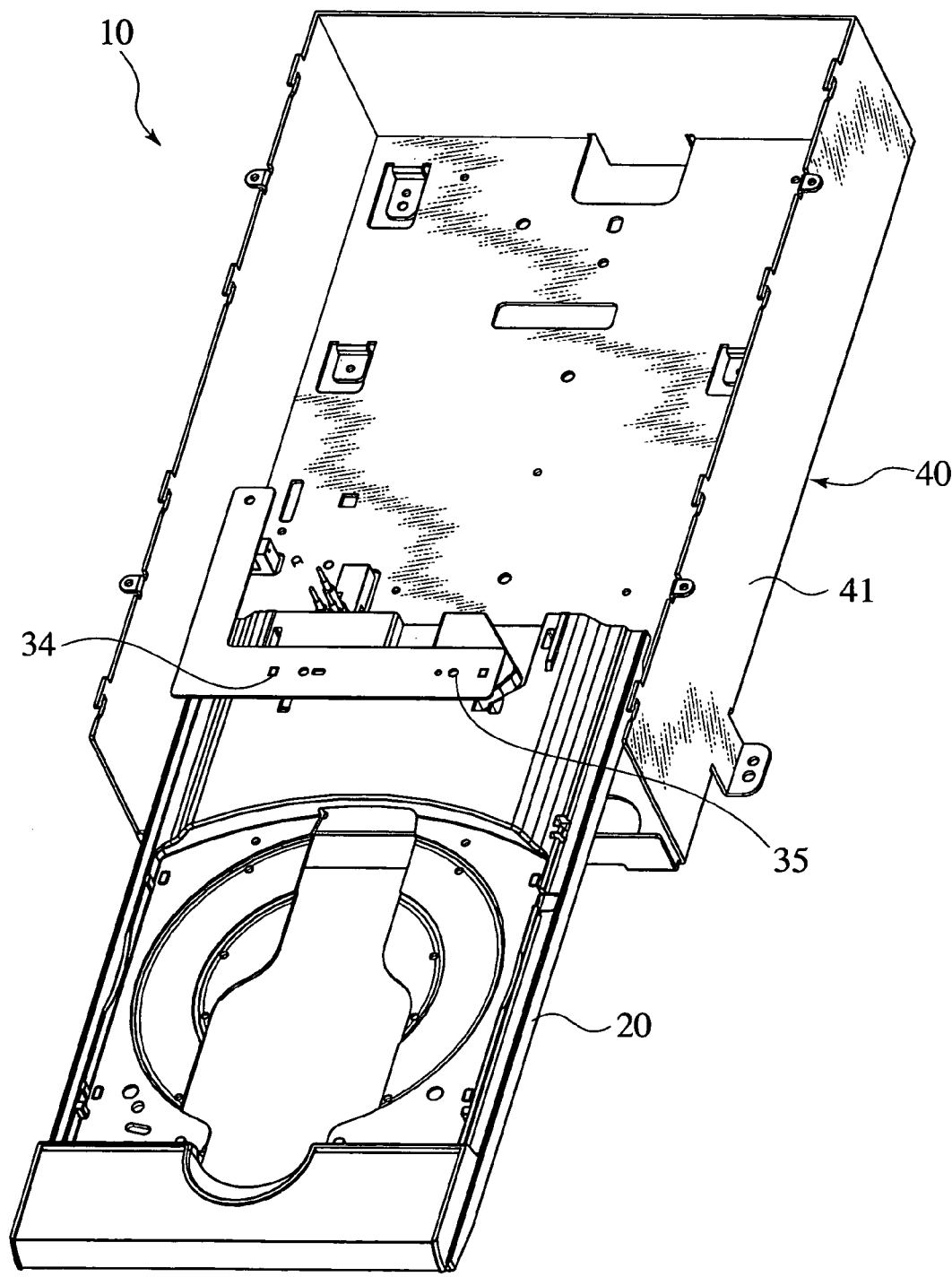
FIG. 7 is a perspective view showing the arrangement of the light receiving diodes.

In addition, as shown in FIG. 7, two light receiving diodes 34 and 35 are provided in the forward side of the disc drive device 40 to be symmetrical in the left and right directions and to be positioned just above the light emitting diodes 32 and 33, the light receiving diodes being mounted on the printed board to be fixed to the back surface of the top cover 42.

Figures 14, 15:
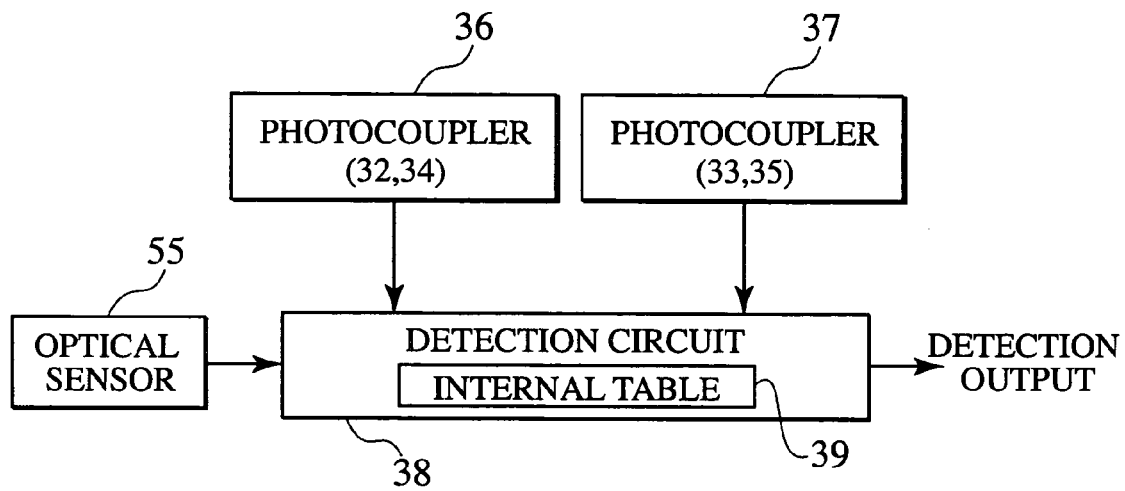
FIG. 14 is a block diagram showing a detection unit.
FIG. 15 shows an internal table indicating reference shade patterns.

Therefore, the light emitting diode 32 and the light receiving diode 34 constitute a first photo-coupler (optical-path generating member) 36, and the light emitting diode 33 and the light receiving diode 35 constitute a second photo-coupler (optical-path generating member) 37 (see FIG. 14).

As the tray 20 is moved, an optical path generated by the first photo-coupler 36 is shaded when the detection holes 30a, 30b, 30c, 30d and 30e aligned on the straight line L1 are closed, and at this time, an output of the light receiving diode 34 becomes "L" (Low) level. On the other hand, when the detection holes are opened, they transmit light therethrough, and at this time, an output of the light receiving diode 34 becomes "H" (High) level.

Likewise, as the tray 20 is moved, an optical path generated by the second photo-coupler 37 is shaded when the detection holes 31a, 31b, 31c, 31d and 31e aligned on the straight line L2 are closed, and at this time, an output of the light receiving diode 35 becomes "L" (Low) level. On the other hand, when the detection holes are opened, they transmit light therethrough, and at this time, an output of the light receiving diode 35 becomes "H" (High) level.

The first and second photo-couplers 36 and 37 are connected to a detection circuit 38 that detects a state including a type of a medium, based on outputs of the light receiving diodes 34 and 35.

As shown in FIG. 14, the first and second photo-couplers 36 and 37 are connected to the detection circuit 38 to input thereinto outputs of the light receiving diode 34 and 35, and the optical sensor 55 is connected to the detection circuit 38 to input thereinto a pulsed output.

The detection circuit 38 includes a counter that counts a pulsed output obtained by using the optical sensor 55 to detect light passing through the slit of the ladder portion 53 provided on the left slide cam 50, and the detection circuit 38 functions as an encoder for confirmation of a position of the moving slide cam 50. Therefore, the detection circuit 38 can accurately recognize the present positions of the slide cam 50 and the tray 20 in their region of movement in real time.

In addition, when the loading motor is driven to load the tray 20 into the disc drive device 40, the detection circuit 38 monitors output levels of the light receiving diode 34 to be able to recognize an opened or closed state of the detection holes 30a, 30b, 30c, 30d and 30e, and likewise monitors output levels of the light receiving diode 35 to be able to recognize an opened or closed state of the detection holes 31a, 31b, 31c, 31d and 31e.

The detection circuit 38 also includes, as an internal table 39, data of patterns (shade patterns of optical paths), in which the detection holes 30a, 31a, 30b, 31b, 30c, 31c, 30d, 31d, 30e and 31e are opened and closed in a process of loading movement of the tray 20.

Figure 11:
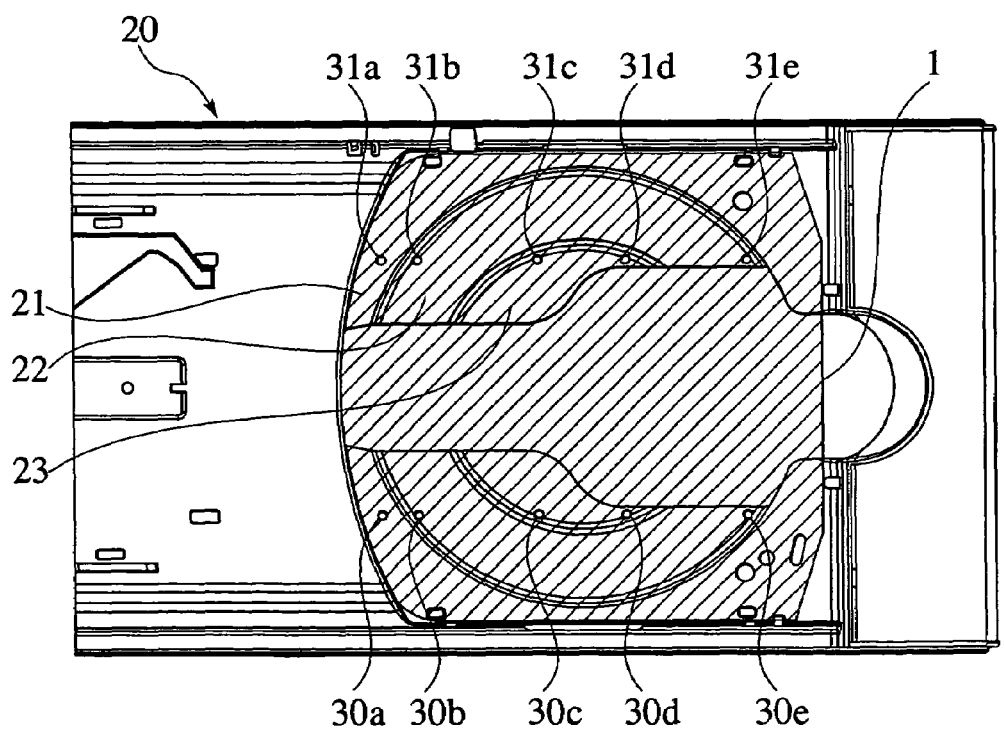
FIG. 11 is a plan view showing the relationship between a cartridge and the detection holes on the tray.

That is, when the cartridge 1 is placed in a predetermined position on the cartridge-placing surface 21 of the tray 20 to be loaded, all the detection holes 30a, 31a, 30b, 31b, 30c, 31c, 30d, 31d, 30e and 31e are closed by the cartridge 1 as shown in FIG. 11, so that data of shade patterns are as indicated in (1) of the internal table 39 shown in FIG. 15.

Figure 12:
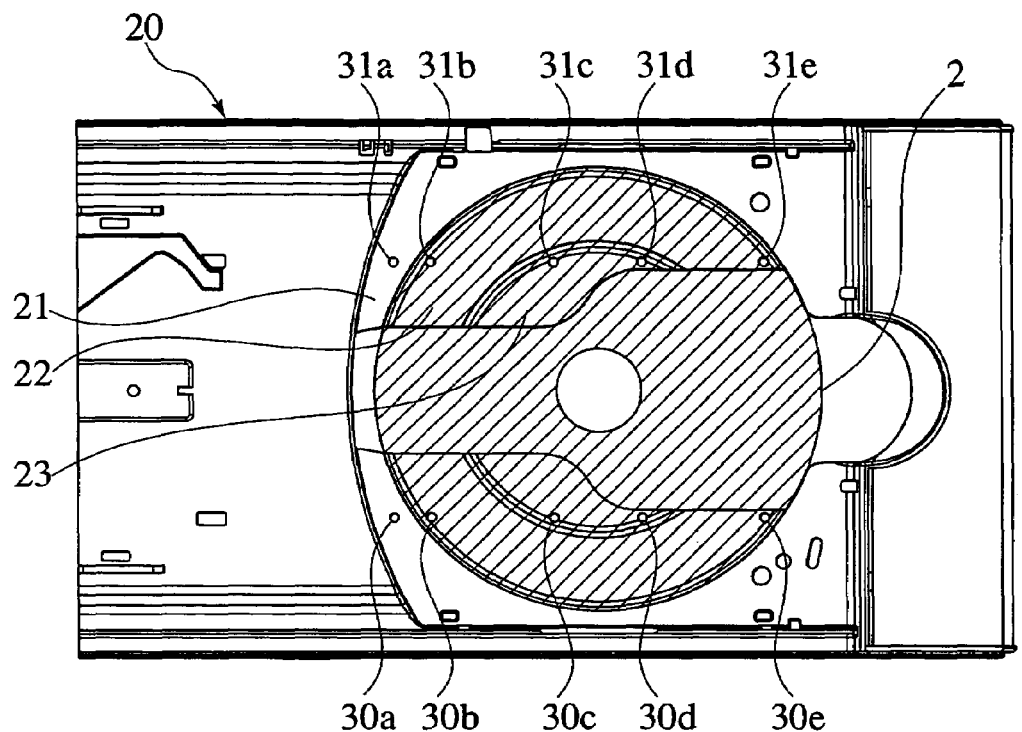
FIG. 12 is a plan view showing the relationship between a 12-cm disc and the detection holes on the tray.

When a large-diameter disc (12-cm disc) 2 is placed in a predetermined position on the large-diameter disc-placing surface 22 of the tray 20 to be loaded, only the detection holes 30a and 31a are opened and the remaining detection holes 30b, 31b, 30c, 31c, 30d, 31d, 30e and 31e are closed by the large-diameter disc (12-cm disc) 2 as shown in FIG. 12, so that data of shade patterns are as indicated in (2) of the internal table 39 shown in FIG. 15.

Figure 13:
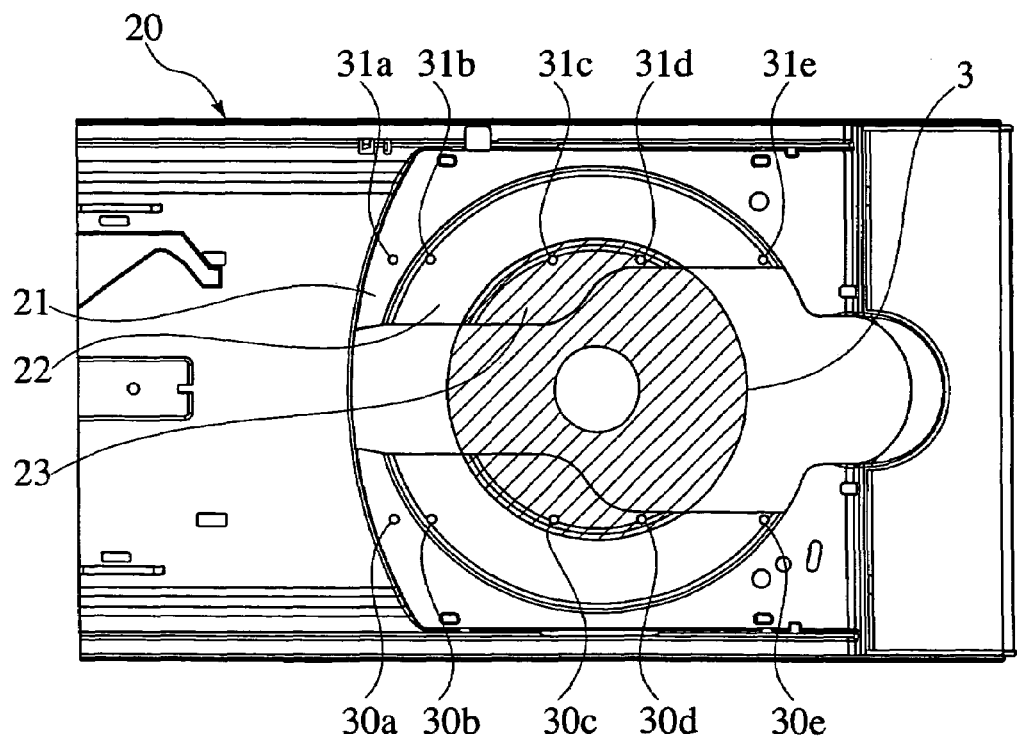
FIG. 13 is a plan view showing the relationship between an 8-cm disc and the detection holes on the tray.

When a small-diameter disc (8-cm disc) 3 is placed in a predetermined position on the small-diameter disc-placing surface 23 of the tray 20 to be loaded, the detection holes 30a, 31a, 30b, 31b, 30e and 31e are opened and the remaining detection holes 30c, 31c, 30d and 31d are closed by the small-diameter disc (8-cm disc) 3 as shown in FIG. 13, so that data of shade patterns are as indicated in (3) of the internal table 39 shown in FIG. 15.

When nothing is placed on the tray 20 and the empty tray is loaded, all the detection holes 30a, 31a, 30b, 31b, 30c, 31c, 30d, 31d, 30e and 31e are opened as shown in FIG. 10, so that data of shade patterns are as indicated in (4) of the internal table 39 shown in FIG. 15.

Accordingly, when the loading motor is driven to load the tray 20 into the disc drive device 40, the detection circuit 38 temporarily stores, in a memory, those data of shade patterns of the detection holes 30a, 31a, 30b, 31b, 30c, 31c, 30d, 31d, 30e and 31e, which are obtained by monitoring output levels of the light receiving diodes 34 and 35. Then, the detection circuit 38 can detect which of the cartridge 1, the large-diameter disc (12-cm disc) 2, and the small-diameter disc (8-cm disc) 3 corresponds to a medium placed on the tray 20, by making a comparison between the temporarily stored data of shade patterns and the reference data of shade patterns in the internal table 39 shown in FIG. 15.

An operation of the disc drive apparatus 10 configured in the above manner will be described as follows.

When any one of the cartridge 1, the large-diameter disc (12-cm disc) 2, and the small-diameter disc (8-cm disc) 3 is placed and an insertion force is applied to the tray 20 in a state that the tray 20 is ejected and drawn out from the disc drive device 40, an operation of loading the tray 20 in the disc drive device 40 is manually started.

In the course of the manual loading operation, an eject end switch (not shown) of the tray 20 detects passage of the tray and a signal thereof turns ON the power of the loading motor. Thereby, the drive gear begins rotation to start movement of the tray 20 in a loading direction, and the pinion gear begins rotation to start movement of the slide cam 50.

At this time, both the optical path of the first photo-coupler 36 composed of the light emitting diode 32 and the light receiving diode 34 and the optical path of the second photo-coupler 37 composed of the light emitting diode 33 and the light receiving diode 35 are shaded by the tray 20, so that outputs of the light receiving diodes 34 and 35 are kept at "L" level.

In a process thus started, in which the tray 20 is moved in the loading direction, the detection circuit 38 counts pulsed outputs of the optical sensor 55 to accurately recognize the present position of the tray 20 in the region of movement in real time.

Further, as the tray 20 is moved in the loading direction, the detection circuit 38 monitors respective output levels of the light receiving diodes 34 and 35 when the detection holes 30a and 31a, the detection holes 30b and 31b, the detection holes 30c and 31c, the detection holes 30d and 31d, and the detection holes 30e and 31e come to positions of the photo-couplers 36 and 37 by turns, thus obtaining data of shade patterns.

By making a comparison between the data of shade patterns thus obtained and the reference data of shade patterns shown in FIG. 15, the detection circuit 38 can detect which of the cartridge 1, the large-diameter disc (12-cm disc) 2, and the small-diameter disc (8-cm disc) 3 corresponds to a medium placed on the tray 20.

In addition, when a position of a medium on the tray 20 is offset from a predetermined position on a predetermined placing surface, the detection circuit 38 can detect such offset in the following manner.

Figure 16:
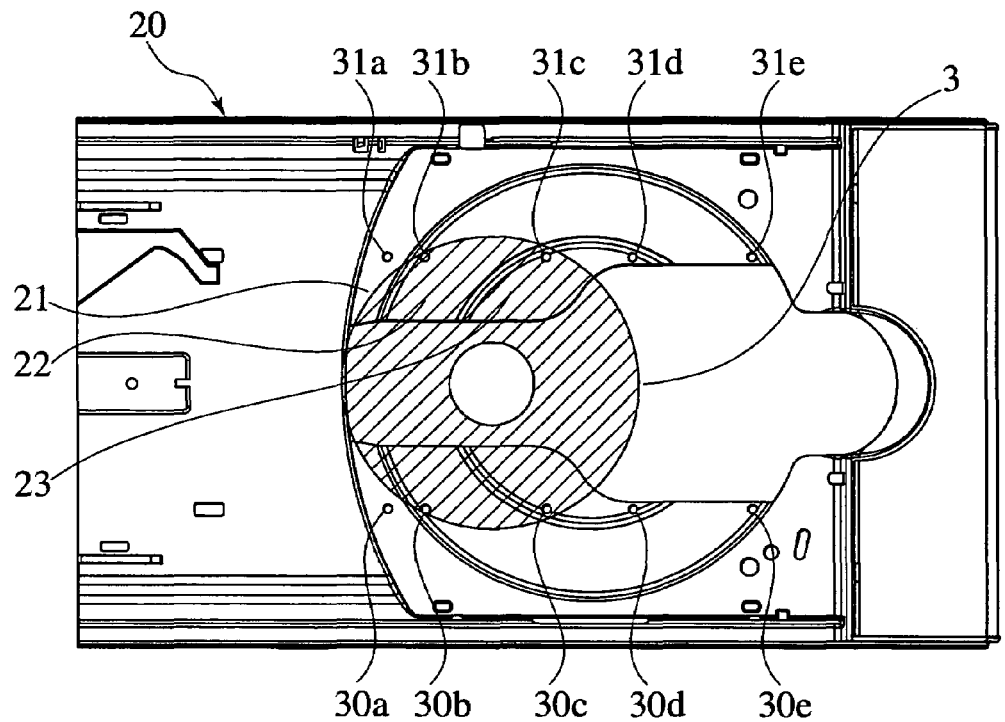
FIG. 16 is a plan view showing the relationship between an 8-cm disc and the detection holes on the tray, as an example of offset-placement of the disc.

That is, for example, when a small-diameter disc (8-cm disc) 3 is placed rearwardly offset from the small-diameter disc-placing surface 23 of the tray 20 as shown in FIG. 16, shade patterns for the detection holes 30a, 30b, 30c, 30d and 30e make "H", "L", "L", "H" and "H" when represented in terms of output levels of the light receiving diode 34. It is the same with shade patterns for the detection holes 31a, 31b, 31c, 31d and 31e.

Such shade patterns are different from any of (1) to (4) of the internal table 39 shown in FIG. 15. Therefore, the detection circuit 38 can detect the fact that a medium is placed offset from a predetermined position on the tray 20.

Figure 17:
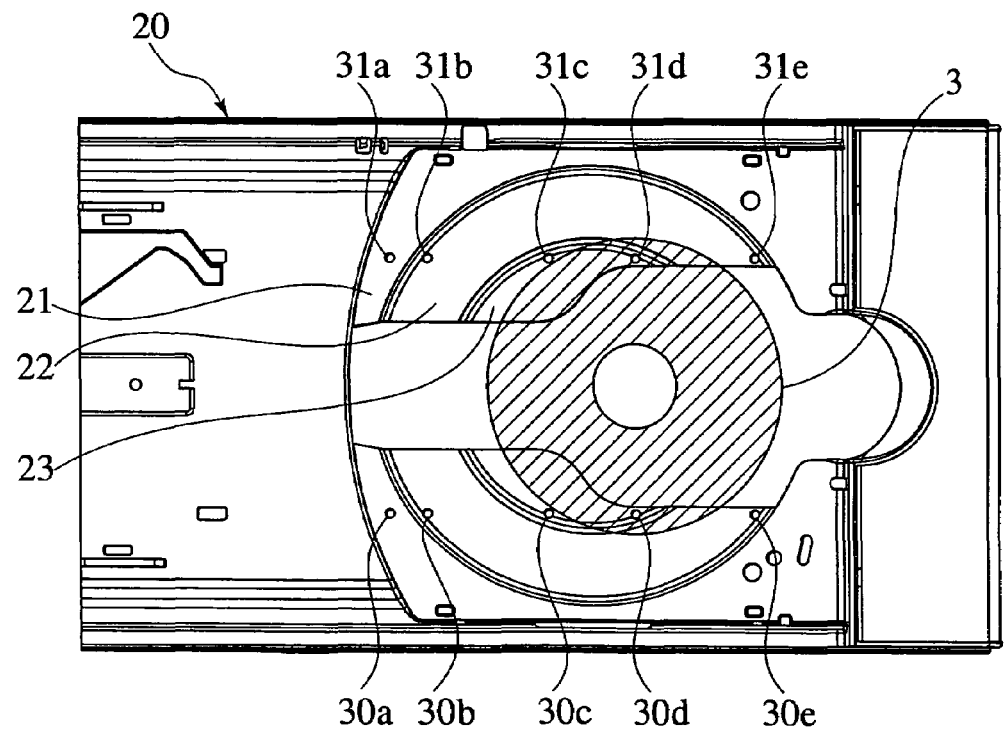
FIG. 17 is a plan view showing the relationship between an 8-cm disc and the detection holes on the tray, as another example of offset-placement of the disc.

Moreover, for example, when a small-diameter disc (8-cm disc) 3 is placed slightly offset in the front side of the small-diameter disc-placing surface 23 of the tray 20 as shown in FIG. 17, shade patterns for the detection holes 30a, 30b, 30c, 30d and 30e make "H", "H", "H", "L" and "H" when represented in terms of output levels of the light receiving diode 34. It is the same with shade patterns for the detection holes 31a, 31b, 31c, 31d and 31e.

Such shade patterns are also different from any of (1) to (4) of the internal table 39 shown in FIG. 15. Therefore, the detection circuit 38 can detect the fact that a medium is placed offset from a predetermined position on the tray 20.

Figure 18:
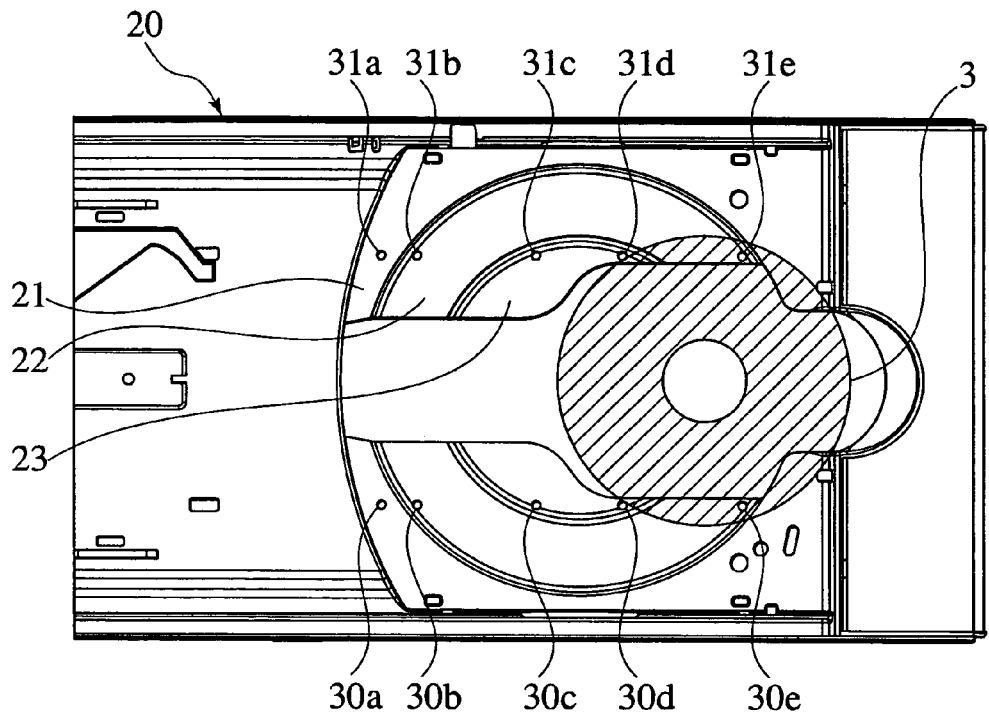
FIG. 18 is a plan view showing the relationship between an 8-cm disc and the detection holes on the tray, as still another example of offset-placement of the disc.

Moreover, for example, when a small-diameter disc (8-cm disc) 3 is placed further offset in the front side of the small-diameter disc-placing surface 23 of the tray 20 as shown in FIG. 18, shade patterns for the detection holes 30a, 30b, 30c, 30d and 30e make "H", "H", "H", "H" and "L" when represented in terms of output levels of the light receiving diode 34. It is the same with shade patterns for the detection holes 31a, 31b, 31c, 31d and 31e.

Such shade patterns are also different from any of (1) to (4) of the internal table 39 shown in FIG. 15. Therefore, the detection circuit 38 can detect the fact that a medium is placed offset from a predetermined position on the tray 20.

Figure 19:
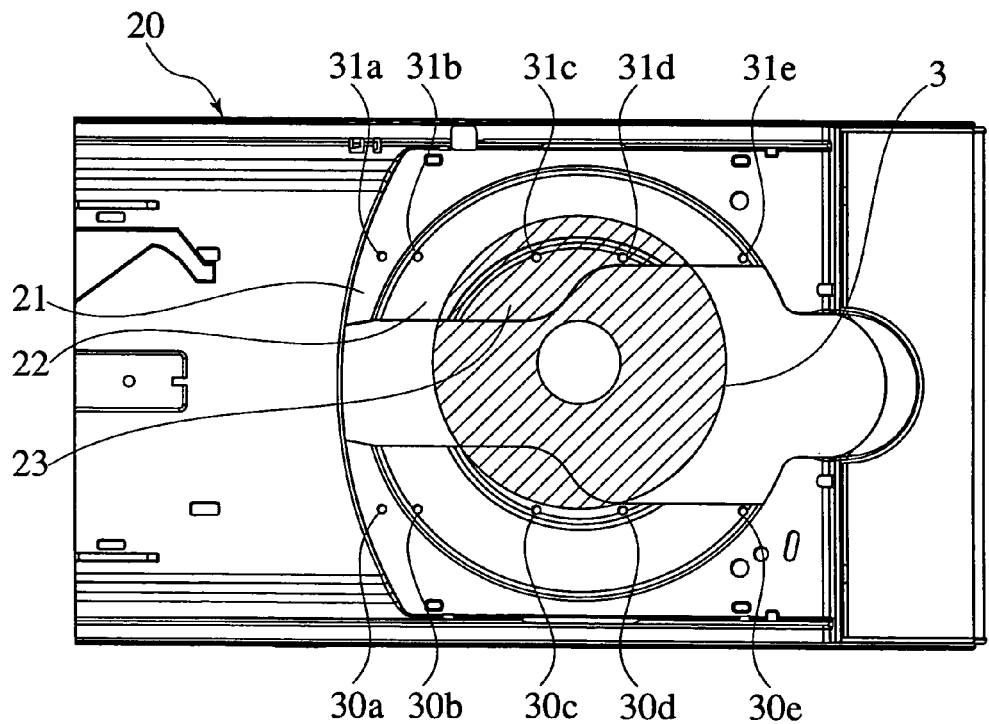
FIG. 19 is a plan view showing the relationship between an 8-cm disc and the detection holes on the tray, as still another example of offset-placement of the disc.

Further, for example, when a small-diameter disc (8-cm disc) 3 is placed slightly offset rightward of the small-diameter disc-placing surface 23 of the tray 20 as shown in FIG. 19, shade patterns for the detection holes 31a, 31b, 31c, 31d and 31e remain unchanged from the reference shade patterns while all shade patterns for the detection holes 30a, 30b, 30c, 30d and 30e make "H" when represented in terms of output levels of the light receiving diode 34.

Such shade patterns are also different from any of (1) to (4) of the internal table 39 shown in FIG. 15. Therefore, the detection circuit 38 can detect the fact that a medium is placed offset from a predetermined position on the tray 20.

As described above, when a medium is placed offset from a predetermined position on the tray 20, the detection circuit 38 can detect such fact in a process, in which the tray 20 is moved in the loading direction, substantially in real time.

Therefore, when it is detected that a medium is placed offset from a predetermined position on the tray 20, the loading motor is reversely rotated to eject the tray 20.

Besides, since both the optical path of the first photo-coupler 36 composed of the light emitting diode 32 and the light receiving diode 34 and the optical path of the second photo-coupler 37 composed of the light emitting diode 33 and the light receiving diode 35 are arranged in the front side of the disc drive device 40, positional offset of a medium on the tray 20 can be detected in a stage as early as possible in a process, in which the tray 20 is moved in the loading direction.

By this operation, it is possible to prevent beforehand, for example, a disc from falling off inside the drive of the disc drive device 40 from the opening 26 of the tray 20 in a process, in which the tray 20 is moved in the loading direction.

In addition, since detection can be made to reversely rotate the loading motor before the disc is clamped, the disc will not be damaged.

The disc drive apparatus according to the invention makes it possible to configure a medium detection system of a simple constitution.

The disc drive apparatus according to the invention also makes it possible to detect states in many positions by a small number of parts.

With the disc drive apparatus according to the invention, arrangement and combination of the detection holes 30 and 31 also make it possible to distinguish an 8-cm disc, a 12-cm disc, and a cartridge from one another.

Further, with the disc drive apparatus according to the invention, even slight offset can be detected by the detection holes 30 and 31 when a disc is erroneously placed.

With the disc drive apparatus according to the invention, it is also possible to shorten a starting time as compared with the conventional apparatus since a medium can be distinguished while the tray 20 is moved.

Moreover, with the disc drive apparatus according to the invention, it is possible to decrease spacing between the detection holes 30 and 31 since positions can be detected with high accuracy.

Further, with the disc drive apparatus according to the invention, mechanical parts are less influenced because detection is performed in non-contact manner.

In addition, with the disc drive apparatus according to the invention, type of a medium and a state, in which a disc is erroneously placed, can be distinguished instantaneously by making a comparison between various states stored in the internal table and outputs.

Further, an arrangement of the detection holes 30 and 31 on the tray 20 is not determined univocally, and the optical path of the first photo-coupler 36 composed of the light emitting diode 32 and the light receiving diode 34 and the optical path of the second photo-coupler 37 composed of the light emitting diode 33 and the light receiving diode 35 are also not determined univocally, but these can be appropriately determined taking account of detection accuracy, and the like.

Since the disc drive apparatus according to the present invention includes a disc drive device, into or from which a tray member with a medium placed thereon is loaded or ejected by the drive unit, and the detection unit that detects a shape and a type of a medium placed on the tray member in the course of loading of the tray member, it is possible to detect a shape and a type of a medium placed on the tray member in the course of loading of the tray member, and there is thus obtained an effect that when, for example, positional offset of a medium is placed is found in the course of loading, an occurrence of an accident can be prevented beforehand by switching the tray member to a ejection mode.

The entire contents of Japanese Patent Application P2003-330421 (filed Sep. 22, 2003) is incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined in the following claims.

What is claimed is:

1. A loading disc optical detection apparatus comprising:
a tray member, on which a bare disc, or a cartridge accommodating a disc therein is placed;
a disc drive device, into or from which the tray member is loaded or rejected by a drive unit;
detection holes provided on the tray member to detect a disc or a cartridge; and
a detection unit provided on the disc drive device to optically detect a state including a type of a disc or a cartridge placed on the tray member based on whether the detection holes are shaded in the course of loading of the tray member,
wherein the tray member comprises a placing-surface, on which at least a disc having one size is placed, and a placing-surface, on which a cartridge is placed, on which surfaces central positions of discs are made vertically coincident together, and the detection holes are aligned at least one to each of the placing-surfaces on straight lines passing over that surface, on which a disc of minimum size is placed, along a movement direction by the drive unit;
wherein the detection unit comprises optical-path generating member provided in the front side of the disc drive device and in upper and lower positions corresponding to tracks of movement, along which the detection holes aligned on the straight lines pass upon movement by the drive unit, the optical-path generating member generating optical paths to intersect the tracks of movement, and a state including a type of a disc or a cartridge placed on the tray member is detected based on shaded patterns of the optical paths by the respective detection holes that pass positions corresponding to the optical-path generating member as the tray member is moved;
and wherein the detection unit prepares data of shaded patterns of the optical paths beforehand to establish a reference for every disc or cartridge being handled when the disc or the cartridge is placed in a predetermined position, and detects what size of a disc or a cartridge a medium placed on the tray member corresponds to, and whether a placement position of the disc or the cartridge is a predetermined position on a predetermined placing-surface, by making a comparison between the data of shade patterns of the optical paths obtained by the movement of the tray member and the reference data of shade patterns of the optical paths.

2. A loading disc optical detection apparatus comprising:
a tray member, on which a bare disc, or a cartridge accommodating a disc therein is placed;
a disc drive device, into or from which the tray member is loaded or rejected by a drive unit;
detection holes provided on the tray member to detect a disc or a cartridge; and
a detection unit provided on the disc drive device to optically detect a state including a type of a disc or a cartridge placed on the tray member based on whether the detection holes are shaded in the course of loading of the tray member,
wherein the tray member comprises a placing-surface, on which at least a disc having one size is placed, and a placing-surface, on which a cartridge is placed, on which surfaces central positions of discs are made vertically coincident together, and the detection holes are aligned at least one to each of the placing surfaces on straight lines passing over that surface, on which a disc of minimum size is placed, along a movement direction by the drive unit;
wherein the tray member comprises an opening of a predetermined width to be clear of an optical pickup, the opening passing through centers of the placing-surfaces along the movement direction by the drive unit, and the detection holes are aligned at least one to each of the placing-surfaces on two straight lines that extend on both sides of the opening along the movement direction;
wherein the detection unit comprises optical-path generating members provided in the front side of the disc drive device and in upper and lower positions corresponding to tracks of movement, along which the respective detection holes aligned on the straight lines pass upon movement by the drive unit, the optical-path generating members generating optical paths to intersect the tracks of movement, and a state including a type of a disc or a cartridge placed on the tray member is detected based on shaded patterns of the optical paths by the respective detection holes that pass positions corresponding to the optical-path generating members as the tray member is moved;
and wherein the detection unit prepares data of shaded patterns of the optical paths beforehand to establish a reference for every disc or cartridge being handled when the disc or the cartridge is placed in a predetermined position, and detects what size of a disc or a cartridge a medium placed on the tray member corresponds to, and whether a placement position of the disc or the cartridge is a predetermined position on a predetermined placing-surface, by making a comparison between the data of shade patterns of the optical paths obtained by the movement of the tray member and the reference data of shade patterns of the optical paths.

3. A loading disc optical detection apparatus comprising:
a tray member, on which a bare disc, or a cartridge accommodating a disc therein is placed;
a disc drive device, into or from which the tray member is loaded or rejected by a drive unit;
detection holes provided on the tray member to detect a disc or a cartridge; and
a detection unit provided on the disc drive device to optically detect a state including a type of a disc or a cartridge placed on the tray member based on whether the detection holes are shaded in the course of loading of the tray member,
wherein the tray member comprises a placing-surface, on which at least a disc having one size is placed, and a placing-surface, on which a cartridge is placed, on which surfaces central positions of discs are made vertically coincident together, and the detection holes are aligned at least one to each of the placing-surfaces on straight lines passing over that surface, on which a disc of minimum size is placed, along a movement direction by the drive unit;
wherein the detection holes on the respective placing-surfaces, on which discs are placed, are arranged slightly inside of outer diameters of recording surfaces of the discs placed in predetermined positions on the placing-surfaces;
wherein the detection unit comprises optical-path generating member provided in the front side of the disc drive device and in upper and lower positions corresponding to tracks of movement, along which the detection holes aligned on the straight lines pass upon movement by the drive unit, the optical-path generating member generating optical paths to intersect the tracks of movement, and a state including a type of a disc or a cartridge placed on the tray member is detected based on shaded patterns of the optical paths by the respective detection holes that pass positions corresponding to the optical-path generating member as the tray member is moved;
and wherein the detection unit prepares data of shaded patterns of the optical paths beforehand to establish a reference for every disc or cartridge being handled when the disc or the cartridge is placed in a predetermined position, and detects what size of a disc or a cartridge a medium placed on the tray member corresponds to, and whether a placement position of the disc or the cartridge is a predetermined position on a predetermined placing-surface, by making a comparison between the data of shade patterns of the optical paths obtained by the movement of the tray member and the reference data of shade patterns of the optical paths.

4. A loading disc optical detection apparatus comprising:
a tray member, on which a bare disc, or a cartridge accommodating a disc therein is placed;
a disc drive device, into or from which the tray member is loaded or rejected by a drive unit;
detection holes provided on the tray member to detect a disc or a cartridge; and
a detection unit provided on the disc drive device to optically detect a state including a type of a disc or a cartridge placed on the tray member based on whether the detection holes are shaded in the course of loading of the tray member,
wherein the tray member comprises a placing-surface, on which at least a disc having one size is placed, and a placing-surface, on which a cartridge is placed, on which surfaces central positions of discs are made vertically coincident together, and the detection holes are aligned at least one to each of the placing-surfaces on straight lines passing over that surface, on which a disc of minimum size is placed, along a movement direction by the drive unit;
wherein the tray member comprises an opening of a predetermined width to be clear of an optical pickup, the opening passing through centers of the placing-surfaces along the movement direction by the drive unit, and the detection holes are aligned at least one to each of the placing-surfaces on two straight lines that extend on both sides of the opening along the movement direction;
wherein the detection holes on the respective placing-surfaces, on which discs are placed, are arranged slightly inside of outer diameters of recording surfaces of the discs placed in predetermined positions on the placing-surfaces;
wherein the detection unit comprises optical-path generating members provided in the front side of the disc drive device and in upper and lower positions corresponding to tracks of movement, along which the respective detection holes aligned on the straight lines pass upon movement by the drive unit, the optical-path generating members generating optical paths to intersect the tracks of movement, and a state including a type of a disc or a cartridge placed on the tray member is detected based on shaded patterns of the optical paths by the respective detection holes that pass positions corresponding to the optical-path generating members as the tray member is moved;
and wherein the detection unit prepares data of shaded patterns of the optical paths beforehand to establish a reference for every disc or cartridge being handled when the disc or the cartridge is placed in a predetermined position, and detects what size of a disc or a cartridge a medium placed on the tray member corresponds to, and whether a placement position of the disc or the cartridge is a predetermined position on a predetermined placing-surface, by making a comparison between the data of shade patterns of the optical paths obtained by the movement of the tray member and the reference data of shade patterns of the optical paths.

* * * * *